April 21, 1964    A. G. VANDERBECK    3,129,671
MONORAIL TRACTOR

Filed Aug. 21, 1961    2 Sheets-Sheet 1

INVENTOR.
ALFRED G. VANDERBECK
BY

ATTORNEY

April 21, 1964  A. G. VANDERBECK  3,129,671
MONORAIL TRACTOR
Filed Aug. 21, 1961  2 Sheets-Sheet 2
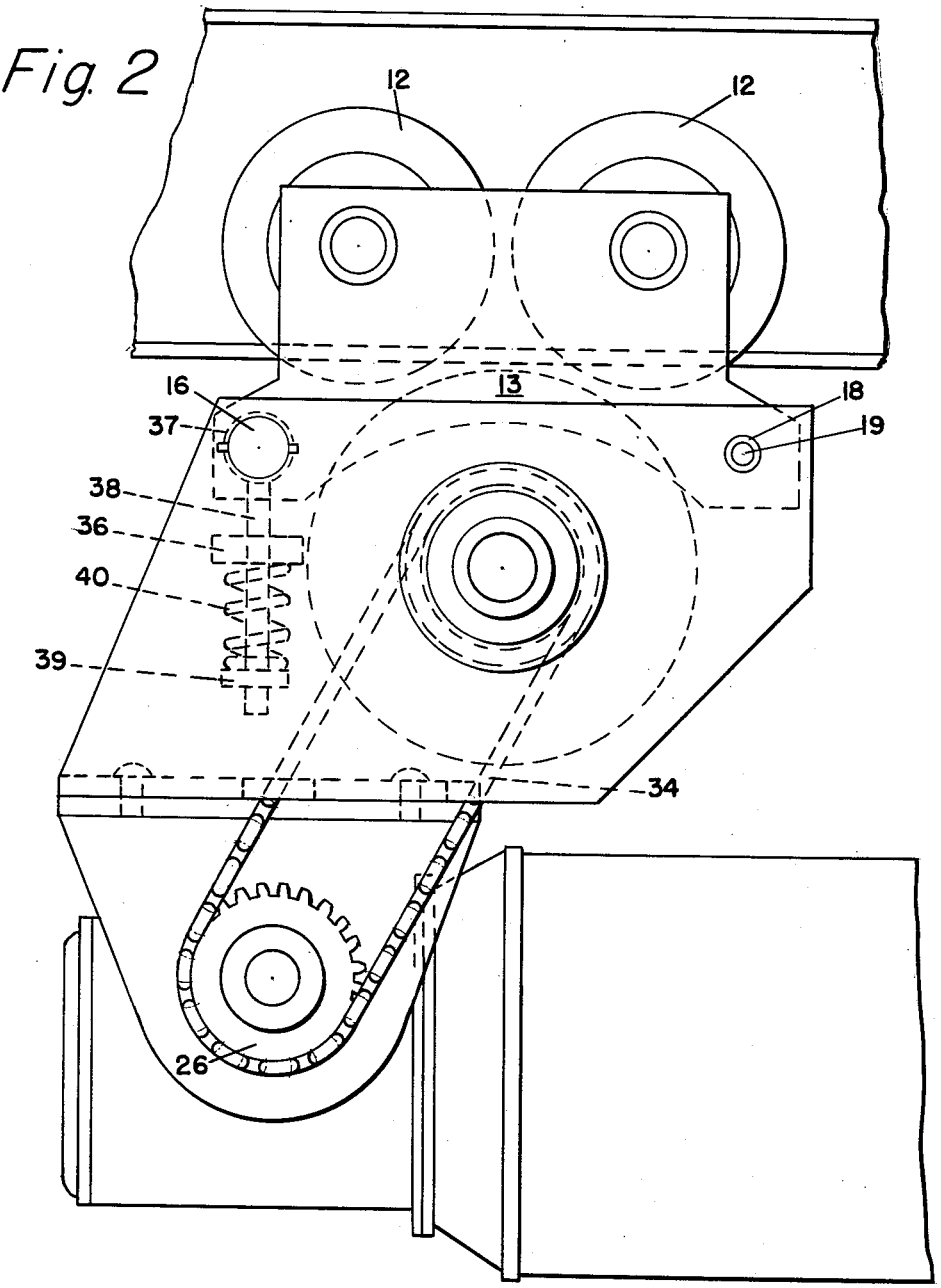
INVENTOR.
ALFRED G. VANDERBECK
BY
ATTORNEY United States Patent Office 3,129,671
Patented Apr. 21, 1964

3,129,671
MONORAIL TRACTOR
Alfred G. Vanderbeck, Colonial Village, Pa., assignor to Aircraft Armaments, Inc., a corporation of Maryland
Filed Aug. 21, 1961, Ser. No. 132,828
7 Claims. (Cl. 105—153)

This invention relates to a tractor device and in particular to a tractor of the type which is arranged to propel a hoisting apparatus along a monorail.

Tractors of this type are in general use in industry to assist a hoist operator in transporting material or equipment from one area of a plant to another. In general, the prior art tractors of this type are constructed of numerous parts which result in cumbersome structures, that are expensive to produce, repair and to operate.

The principal object of this invention is to provide a tractor construction which is arranged to travel along the upper surfaces of a monorail by a rotative driving force applied constantly to the undersurface of the monorail.

Another object of my invention is to provide a tractor for use on monorails and is made up of a minimum of parts which are readily assembled into an efficient operating unit.

Another object is to provide a monorail tractor unit which insures positive control by an operator during movement of the hoist mechanism.

Another object is to provide a monorail tractor unit which provides an adequate drive over all traction surfaces.

Other objects of the invention will become apparent from the following detailed description of the invention:

FIG. 2 is a side elevation view as seen from the right side of FIG. 1.

Figure 1:
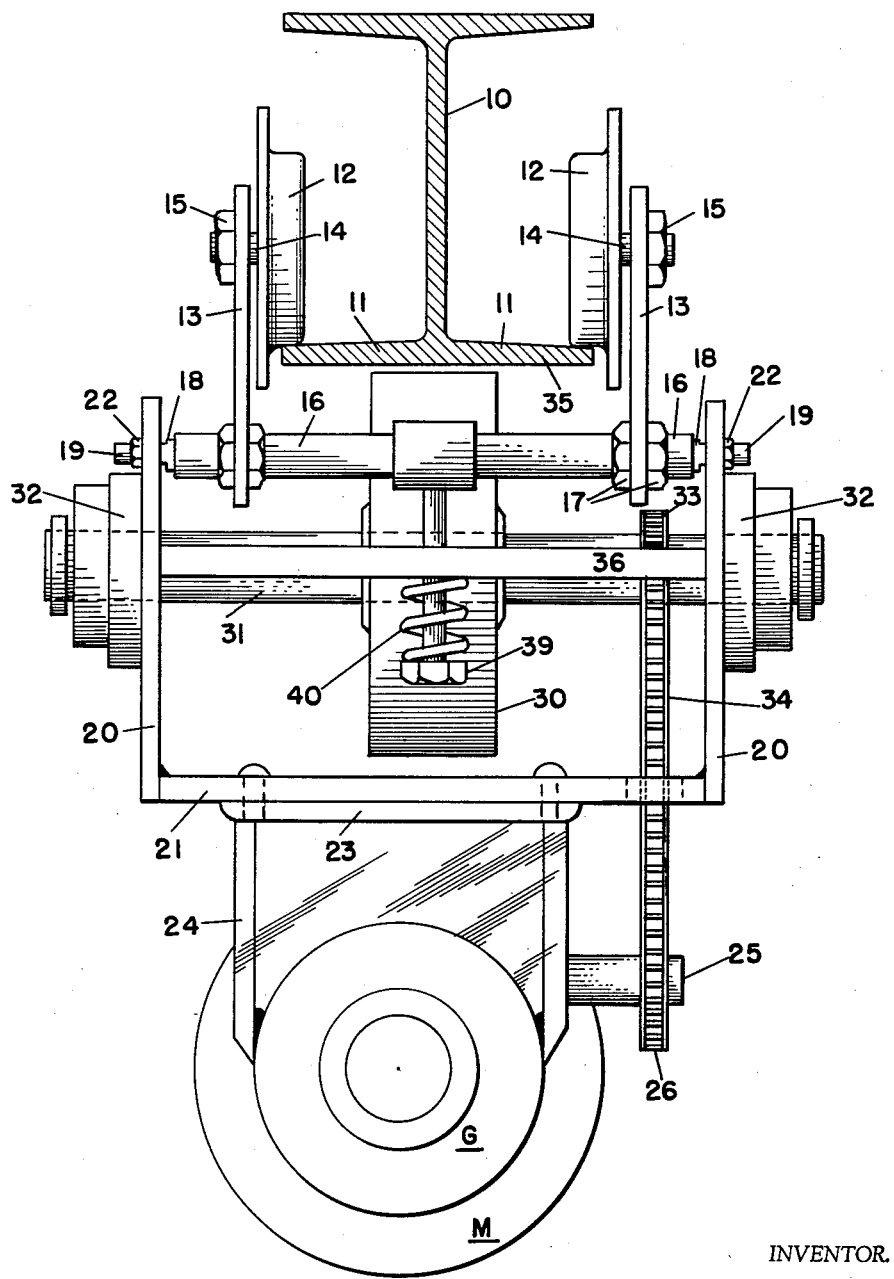
FIG. 1 is a view of the device in front elevation with portions removed for the purpose of clarity.

Referring to FIGS. 1 and 2, a monorail in the form of an I-beam is shown at 10 having lower flanges 11—11. The I-beam will be mounted a suitable distance above the floor level of a plant in which material is to be handled or conveyed and will take a straight or curved course as desired. The tractor rollers in the form of wheels are indicated at 12 and preferably will be arranged in front and rear pairs and each front and rear roller of a pair is rotatably mounted in a frame 13. As in FIG. 1 the rollers 12 are suitably secured to the frames 13—13 by means of stub axles 14 and lock nuts 15 while the frames 13—13 are secured together in properly spaced relation to maintain the rollers 12 on the flanges 11. This is accomplished by means of a front tie rod 16 and locking nuts 17—17 as in FIG. 1 and a rear tie rod 18, which is shown of smaller diameter for the purpose of clarity and the ends of which are of reduced diameter as indicated at 19 for a purpose to be explained.

Side plates 20—20 provide supports or mounting means for equipment used to propel the rollers 12 along the flanges 11—11, and these plates 20—20 are secured together by a lower transverse base 21. The reduced diameter ends 19 of the rear tie rod 18 extend through the side plates 20—20 in their rear upper edge portions as shown in FIG. 2 and are secured by nuts 22 to permit the side plates and base 21 to pivot about shaft 18 as a unit. A bracket 23 is secured to the base plate 21 as by bolts and the depending skirts 24 of the bracket are welded to a unit consisting of a motor M and gear box G having a drive shaft 25 extending therefrom which is provided with a first or drive sprocket 26.

A friction or traction wheel 30 of resilient material is mounted generally centrally of a shaft 31 which is to be driven by the motor M and gear box unit G. The shaft 31 is rotatably secured in bearing hubs 32 and the drive wheel 30 is rotated along therewith by means of a second or driven sprocket 33, which is fixed to shaft 31, and a sprocket chain 34 which interconnects the sprockets 26 and 33. The longitudinal axis of motor M is aligned with the longitudinal axis of the overhead beam 10, and the housing of the motor is disposed substantially within the lateral limits defined by the vertical planes in which the traction wheel or roller supports 20, 20 lie.

In order to move the tractor wheels along the flanges 11—11 it is necessary to maintain the traction wheel 30 in frictional or pressure contact with the under face 35 of the I-beam. To this end a transverse brace 36, interconnects the side plates 20—20 and is vertically aligned and in a lower plane with front tie rod 16 as is shown in FIG. 2. A strap type yoke 37 carries a connecting rod 38 which extends through an aperture in the transverse brace 36 and has an adjusting nut 39 adjacent its lower end. A spring 40 is disposed between the brace 36 and adjusting nut 39 and these members provide upper and lower abutments for maintaining the spring 40 in compression to constantly urge the side walls 20 and structure supported thereby in an upward direction. The drive wheel 30 may thus be positioned in constant contact with the surface 35 of the I-beam since the lower abutment 39 provides a ready adjusting expedient for maintaining the spring 40 under proper compression.

It is essential that the wheel 30 have a resilient surface and may, for example, take the form of a solid or pneumatic tire of natural or artificial rubber in order to cooperate effectively with the biasing spring 40. It is desirable, and under certain uses it will be necessary that the traction wheel 30 have considerable resiliency in order to pass over rough or uneven surfaces, such as joints found between sections of monorail.

Although the invention has been described in connection with a preferred structural embodiment it will be understood that variations and modifications of this structure may be made without departing from the spirit or principles of the invention as defined in the appended claims.

That which is claimed is:

1. In combination with an overhead beam providing opposed upper roller surfaces and a lower traction surface, a pair of vertically disposed roller frames arranged in parallel relation and each of said frames having at least one roller journalled thereon, a first tie rod between the frames adjacent one end and a second tie rod between the frames adjacent the opposite end, said tie rods spacing the rollers for reception on the upper surfaces of the overhead beam, a pair of vertically disposed traction wheel supports, one support arranged in spaced parallel relation exteriorly of one of the roller frames and the other support arranged in spaced parallel relation exteriorly of the other of the roller frames, means pivotally mounting the traction wheel supports to the roller frames adjacent one end, a transverse brace securing the opposite end of the traction wheel supports together, spring means secured between the second tie rod and said transverse brace, an axle rotatably mounted in said traction wheel supports having a traction wheel disposed beneath the lower surface of the overhead beam, said spring means biasing the traction wheel in contact with the lower traction surface of said overhead beam and operating means including a motor carried by the traction wheel supports for rotating the traction wheel, the longitudinal axis of said motor being aligned with the longitudinal axis of said overhead beam, and the housing of said motor being disposed substantially within the limits of the vertical planes in which said traction wheel supports lie.

2. The combination as in claim 1, further characterized by a horizontal plate secured between the traction wheel supports below the traction wheel and said plate providing a support for the operating means.

3. In combination with an overhead beam providing opposed upper roller surfaces and a lower traction surface, a pair of vertically disposed roller frames arranged in parallel relation and each of said frames having a front and rear roller journalled thereon, a first tie rod between the frames adjacent one end and a second tie rod between the frames adjacent the opposite end, said tie rods spacing the rollers for reception on the upper surfaces of the overhead beam, a pair of vertically disposed traction wheel supports, one support arranged in spaced parallel relation exteriorly of one of the roller frames and the other support arranged in spaced parallel relation exteriorly of the other of the roller frames, one of said tie rods pivotally mounting the traction wheel supports to the roller frames adjacent one end, a transverse brace securing the opposite end of the traction wheel supports together, spring means secured between the second tie rod and said transverse brace, an axle rotatably mounted in said traction wheel supports having a traction wheel disposed beneath the lower surface of the overhead beam, said spring means biasing the traction wheel in contact with the lower traction surface of said overhead beam and operating means including a motor carried by the traction wheel supports for rotating the traction wheel, the longitudinal axis of said motor being aligned with the longitudinal axis of said overhead beam, and the housing of said motor being disposed substantially within the limits of the vertical planes in which said traction wheel supports lie.

4. The combination as in claim 3, further characterized by said first tie rod pivotally mounting the traction wheel supports to the roller frames.

5. In combination with an overhead beam providing opposed upper travel surfaces and a lower traction surface, a pair of vertically disposed roller frames arranged in parallel relation and each of said frames having a front and rear roller journalled thereon, a first tie rod between the frames adjacent one end and a second tie rod between the frames adjacent the opposite end, said tie rods spacing the rollers for reception on the upper travel surfaces of the overhead beam, a pair of vertically disposed traction wheel supports, one support arranged in spaced parallel relation exteriorly of one of the roller frames and the other support arranged in spaced parallel relation exteriorly of the other of the roller frames, shaft means pivotally mounting the traction wheel supports to the roller frames adjacent one end, a transverse brace securing the opposite end of the traction wheel supports together, a connecting rod fixed to the second tie rod and mounted in movable relation with said transverse brace, spring means about the connecting rod and adjusting means for maintaining the spring means in compression, an axle rotatably mounted in said traction wheel supports having a traction wheel disposed beneath the lower surface of the overhead beam, said spring means biasing the traction wheel in contact with the lower traction surface of said overhead beam and means including a motor carried by the traction wheel supports for rotating the traction wheel, the longitudinal axis of said motor being aligned with the longitudinal axis of said overhead beam, and the housing of said motor being disposed substantially within the limits of the vertical planes in which said traction wheel supports lie.

6. The combination as in claim 5, further characterized by said spring means being disposed between the second tie rod and said transverse brace and said adjusting means comprising a nut having a screw threaded connection with the outer end of the connecting rod.

7. The combination as in claim 1, further characterized by said operating means comprising a motor and gear box unit having a drive shaft positioned below and in parallel relation with the traction wheel axle, a first sprocket wheel thereon and a second sprocket wheel on the axle and chain means between said sprockets.

References Cited in the file of this patent
UNITED STATES PATENTS

| 2,617,365 | Martin | Nov. 11, 1952 |
| 2,974,609 | Bent et al. | Mar. 14, 1961 |

FOREIGN PATENTS

| 825,288 | Great Britain | Dec. 16, 1959 |